(12) United States Patent
Yoshimoto et al.

(10) Patent No.: US 6,519,163 B1
(45) Date of Patent: Feb. 11, 2003

(54) POWER SUPPLY UNIT

(75) Inventors: Takayuki Yoshimoto, Iizuka (JP);
Yasunobu Fushihara, Iizuka (JP); Seiji Kawano, Iizuka (JP); Takayuki Katayama, Iizuka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 197 days.

(21) Appl. No.: 09/608,099

(22) Filed: Jun. 30, 2000

(30) Foreign Application Priority Data

Jul. 5, 1999 (JP) .......................................... 11-191030

(51) Int. Cl.[7] .............................................. H02M 3/335
(52) U.S. Cl. ...................................... 363/21.01; 363/80
(58) Field of Search .............. 363/16, 19, 21.01–21.18, 363/39, 40, 44, 78, 79, 80, 97

(56) References Cited

U.S. PATENT DOCUMENTS

| 4,956,761 A | 9/1990 | Higashi ........................ 363/19 |
| 5,852,550 A | 12/1998 | Majid et al. ................... 363/21 |
| 5,872,704 A | 2/1999 | Kim ............................. 363/20 |
| 6,088,243 A | * 7/2000 | Shin ......................... 363/97 X |

FOREIGN PATENT DOCUMENTS

| DE | 3638035 | 5/1988 |
| DE | 19537876 | 4/1996 |
| EP | 0638985 | 2/1995 |
| EP | 0671807 | 9/1995 |
| EP | 0875983 | 4/1998 |
| JP | 08130871 | 5/1996 |
| JP | 2000333448 A | * 11/2000 |

* cited by examiner

Primary Examiner—Jessica Han
(74) Attorney, Agent, or Firm—Ladas & Parry

(57) ABSTRACT

A power supply unit includes a transformer converting an input voltage into a predetermined output voltage, a transistor controlling a current flowing through a primary winding of the transformer, an output voltage detecting circuit detecting an output voltage of the power supply unit and outputting a detection signal corresponding to a level of the output voltage, a control circuit controlling the output voltage by switching on and off the transistor in accordance with the detection signal, and an operation control circuit controlling an operation of the control circuit in accordance with the output voltage

8 Claims, 4 Drawing Sheets

POWER SUPPLY UNIT

BACKGROUND OF THE INVENTION

1. Field of the Invention

The present invention generally relates to power supply units, and more particularly, to a power supply unit for a DC-DC conversion.

2. Description of the Related Art

FIG. 1 is a schematic circuit diagram of a conventional power supply unit. A power supply unit 1 is an AC adapter converting an AC input supplied from an AC power supply 2 connected thereto into a DC voltage, which is supplied to a load 3.

The power supply unit 1 includes a fuse 4, a rectifier circuit 5 on a primary side, a capacitor C1, a transformer 6, a transistor Q1, a control circuit 7, a rectifier circuit 8 on a secondary side, and an output voltage detecting circuit 9.

The fuse 4 is blown to cut off the supply of current when an overcurrent flows from the AC power supply 2 into the power supply unit 1. The rectifier circuit 5 on the primary side is a bridge rectifier circuit including four diodes, and rectifies an alternating current supplied from the AC power supply 2. The current rectified by the rectifier circuit 5 on the primary side is supplied to one end of a primary winding L1 of the transformer 6. The transistor Q1 is connected to another end of the primary winding L1 thereof.

The transistor Q1 is a field-effect transistor, which includes a drain connected to the other end of the primary winding L1, a source connected to a wiring line 16 on the negative-potential side of a circuit on the primary side, and a gate connected to the control circuit 7. The control circuit 7 controls a DC output voltage by switching ON/OFF the transistor Q1 by controlling the gate potential of the transistor Q1.

The control circuit 7 supplies the gate of the transistor Q1 with a switching pulse having a predetermined frequency, in accordance with which the transistor Q1 is switched ON/OFF. A pulsed current flows through the primary winding L1 by the ON/OFF switching operation of the transistor Q1.

The transformer 6 includes the primary winding L1 and a secondary winding L2, and generates a voltage in the secondary winding L2 in accordance with the current flowing through the primary winding L1. The above generated voltage depends on the ratio of the number of turns on the primary winding L1 to that of turns on the secondary winding L2.

The voltage generated in the secondary winding L2 is supplied to the rectifier circuit 8 on the secondary side, which includes a diode D1 and a capacitor C2. The diode D1 performs a half-wave rectification on an alternating current generated in the secondary winding L2, and the capacitor C2 absorbs the pulsation of the rectified voltage. The voltage rectified by the rectifier circuit 8 on the secondary side is supplied to the load 3 as an output voltage.

The output voltage detecting circuit 9, which includes resistors R1 through R4, a photo-coupler 10, and a shunt regulator 11, detects the output voltage supplied to the load 3. The resistors R1 through R3 divide the output voltage, and a divided voltage is applied to the input terminal of the shunt regulator 11.

FIG. 2 is a circuit diagram of the shunt regulator 11. The shunt regulator 11 compares a voltage $C_{ont}$ of the connecting point of the resistor R2 with the resistor R3 and a reference voltage $V_{ref}$ generated inside the shunt regulator 11, and outputs a voltage based on the result of the comparison. The shunt regulator 11 includes a Zener diode 12, a differential amplifier 13, and an NPN transistor 14. The Zener diode 12 generates the reference voltage $V_{ref}$. The differential amplifier 13 compares the reference voltage $V_{ref}$ generated by the Zener diode 12 and the voltage $C_{ont}$ of the connecting point of the resistor R2 with the resistor R3, and supplies a current to the base of the NPN transistor 14 in accordance with the voltage difference therebetween. The NPN transistor 14, which is controlled by an output signal of the differential amplifier 13, includes a collector connected to the photo-coupler 10 and an emitter connected to the lower potential side of the load 3.

The differential amplifier 13 increases/decreases the base potential of the NPN transistor 14 as the potential of the connecting point of the resistor R2 with the resistor R3 increases/decreases.

The shunt regulator 11 draws more/less current from the photo-coupler 10 as the potential of the connecting point of the resistor R2 with the resistor R3 increases/decreases, that is, the load 3 consumes less/more current.

The photo-coupler 10 includes a light-emitting diode D2 and a phototransistor Q2 disposed to face the light-emitting diode D2. The light-emitting diode D2 is connected to the shunt regulator 11. The light-emitting diode D2 emits more/less amount of light as the shunt regulator 11 draws more/less current.

The phototransistor Q2, which includes a collector connected to a wiring line 15 on the positive-potential side of the circuit on the primary side, and an emitter connected to the control circuit 7, controls a current flowing from the emitter in accordance with the amount of light emitted from the light-emitting diode D2.

The control circuit 7, which is connected to the emitter of the phototransistor Q2 of the photo-coupler 10, supplies the switching pulse to the gate of the transistor Q1 in accordance with the current flowing from the emitter of the phototransistor Q2.

The transistor Q1 is switched ON/OFF by the switching pulse supplied from the control circuit 7. The transformer 6 transmits an electric power from the primary winding L1 to the secondary winding L2 in accordance with the ON/OFF switching operation of the transistor Q1.

The control circuit 7 is connected to the wiring line 15 on the positive-potential side of the circuit on the primary side, and thus is constantly supplied with a driving current so as to be in an ever-driven state.

When the current consumed in the load 3 is reduced, the output voltage between outputs terminals $T_{out}1$ and $T_{out}2$ starts to rise. Then, the potential of the connecting point of the resistor R2 with the resistor R3 also starts to rise, thus resulting in an increase in the current which the shunt regulator 11 draws. In accordance with this increase in the current, the light-emitting diode D2 of the photo-coupler 10 emits more amount of light, and more current flows from the emitter of the phototransistor Q2 into the control circuit 7.

The control circuit 7 then controls the switching pulse supplied to the gate of the transistor Q1 so that the transistor Q1 is ON for a shorter period of time, thus reducing the electric power transmitted from the primary winding L1 of the transformer 6 to the secondary winding L2 thereof. Then, the output voltage between the output terminals $T_{out}1$ and $T_{out}2$ is controlled to become lower to keep a constant value.

On the other hand, when the current consumed in the load 3 is increased, the output voltage between outputs terminals $T_{out}1$ and $T_{out}2$ starts to lower. Then, the potential of the connecting point of the resistor R2 with the resistor R3 also starts to lower, thus resulting in a decrease in the current which the shunt regulator 11 draws. In accordance with this decrease in the current, the light-emitting diode D2 of the photo-coupler 10 emits less amount of light, and less current flows from the emitter of the phototransistor Q2 into the control circuit 7.

The control circuit 7 then controls the switching pulse supplied to the gate of the transistor Q1 so that the transistor Q1 is ON for a longer period of time, thus increasing the electric power transmitted from the primary winding L1 of the transformer 6 to the secondary winding L2 thereof. Then, the output voltage between the output terminals $T_{out}1$ and $T_{out}2$ is controlled to become higher to keep a constant value.

However, according to the conventional power supply unit 1, there exists a problem that the control circuit 7 is driven to unnecessarily consume a current, or electric power even if the load 3 is disconnected. This is because the control circuit 7 is driven by a DC voltage which is obtained by rectifying, via the rectifier circuit 5 on the primary side and the capacitor C1, the AC input supplied from the AC power supply 2 to the side of the primary winding L1 of the transformer 6.

SUMMARY OF THE INVENTION

It is a general object of the present invention to provide a power supply unit in which the above disadvantage is eliminated.

A more specific object of the present invention is to provide a power supply unit which can reduce the power consumption.

The above objects of the present invention are achieved by a power supply unit including a transformer converting an input voltage into a predetermined output voltage, a transistor controlling a current flowing through a primary winding of the transformer, an output voltage detecting circuit detecting an output voltage of the power supply unit and outputting a detection signal corresponding to a level of the output voltage, a control circuit controlling the output voltage by switching on and off the transistor in accordance with the detection signal, and an operation control circuit controlling an operation of the control circuit in accordance with the output voltage.

According to the above power supply unit of the present invention, the supply of the main driving voltage to the control circuit is cut off, and the control circuit is controlled to only intermittently operate by the operation control circuit when the load is disconnected from the power supply unit, and the output voltage falls below a predetermined value. Therefore, the power consumption thereof can be reduced.

The above objects of the present invention are also achieved by a power supply unit including a transformer, a first control circuit controlling switching of a current flowing through a primary winding of the transformer, and a second control circuit causing the first control circuit to be intermittently enabled when no load is connected to a secondary winding of the transformer.

The above objects of the present invention are also achieved by a power supply unit including a transformer, a first control circuit controlling switching of a current flowing through a primary winding of the transformer, and a power supply system supplying power to the first control circuit so that the power is constantly supplied thereto when a load is connected to a secondary winding of the transformer and is intermittently supplied when no load is connected.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will be given of an embodiment of the present invention by referring to the accompanying drawings.

Figure 3:
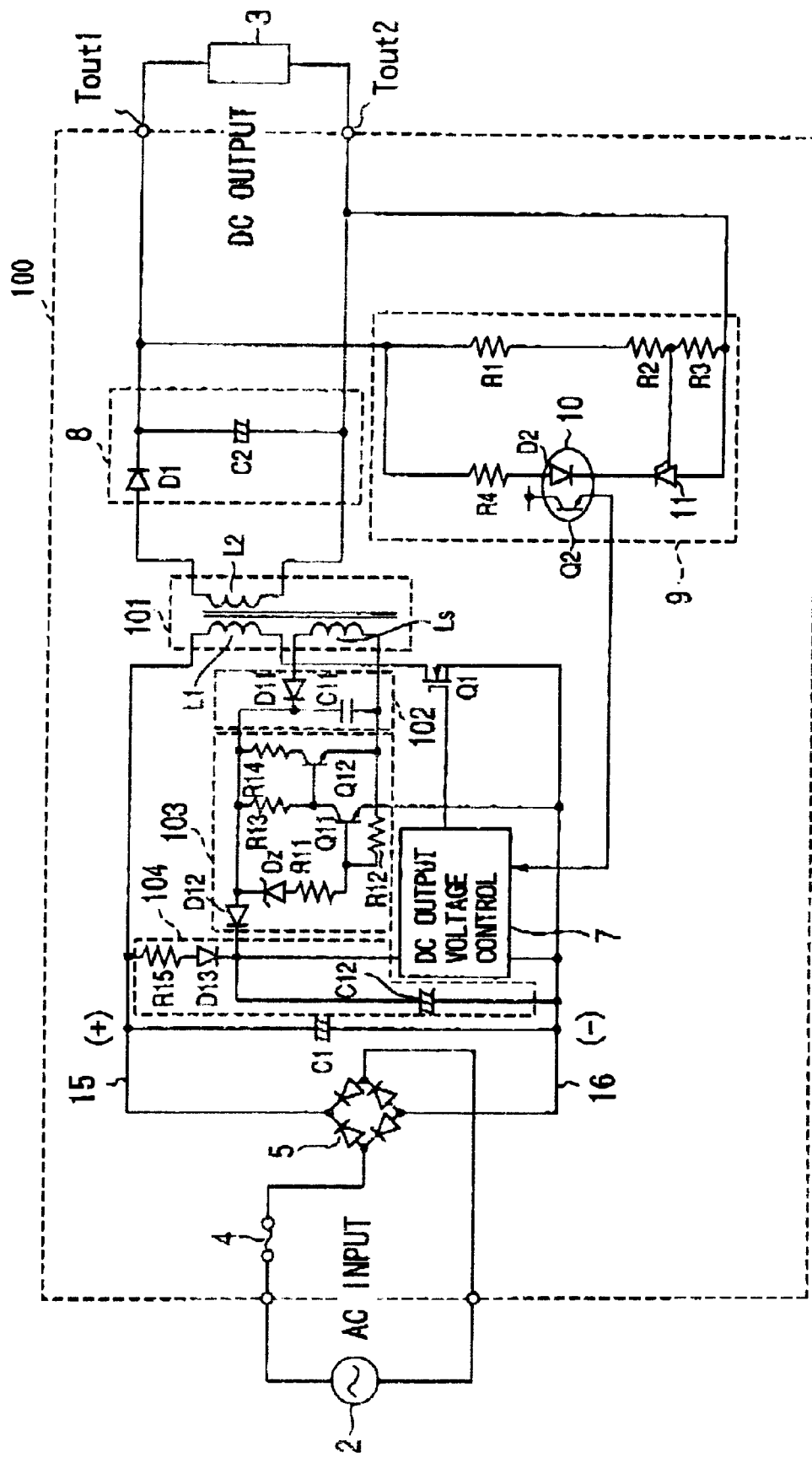
FIG. 3 is a schematic block diagram of a power supply unit according to an embodiment of the present invention.

FIG. 3 is a schematic block diagram of a power supply unit 100 according to the embodiment of the present invention. In FIG. 3, the same elements as those of FIG. 1 are referred to by the same numerals, and a description thereof will be omitted.

Figure 1:
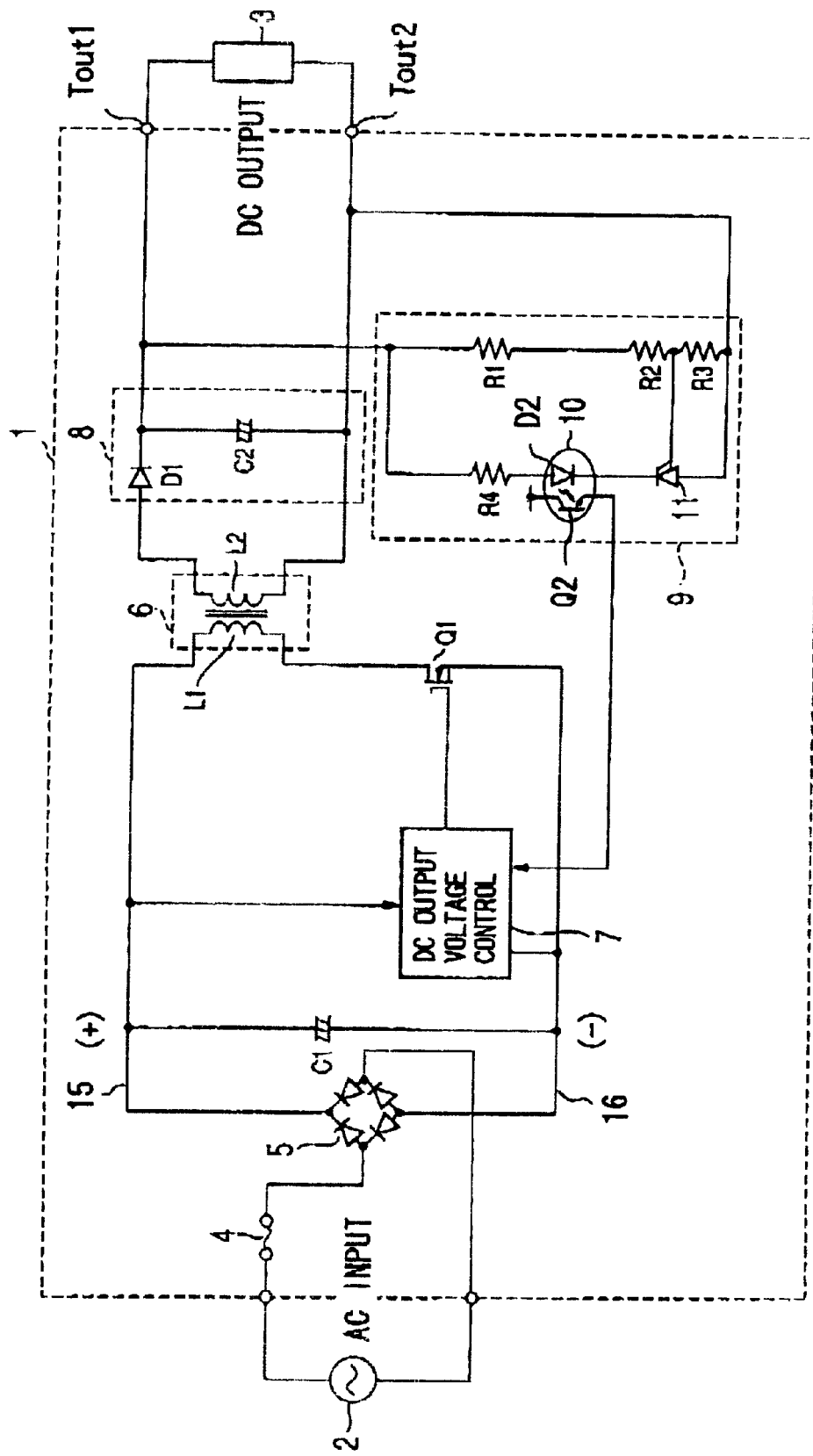
FIG. 1 is a schematic circuit diagram of a conventional power supply unit.
Figure 2:
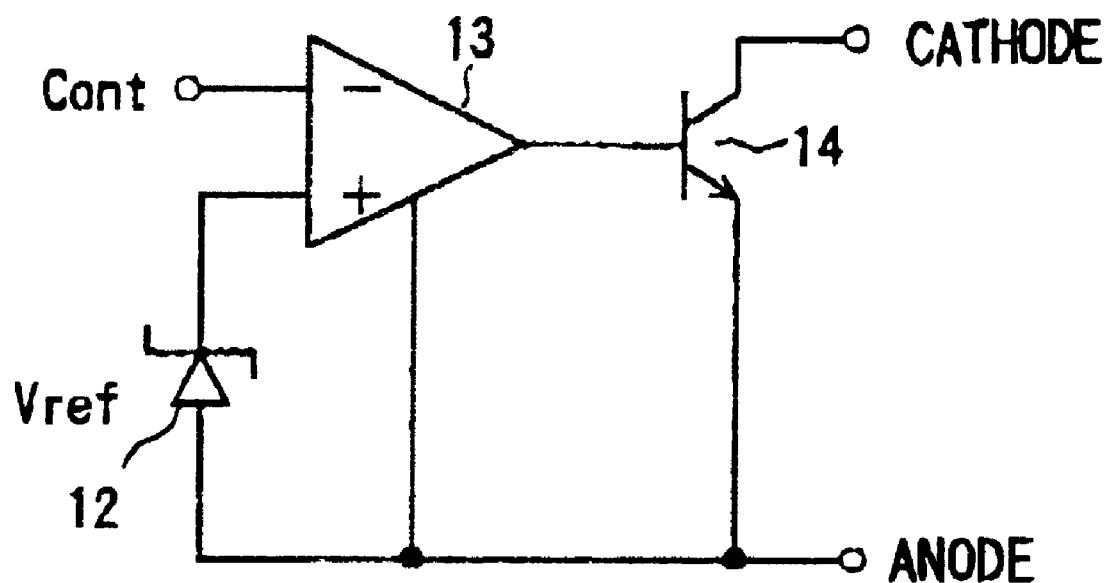
FIG. 2 is a circuit diagram of a conventional shunt regulator.

The power supply unit 100 according to the present embodiment differs from the conventional power supply unit 1 shown in FIG. 1 in the structure of a transformer 101, and in that the power supply unit 100 further includes a rectifier circuit 102, a switching circuit 103, and a supplementary driving circuit 104.

The switching circuit 103 and the supplementary driving circuit 104 form a voltage control circuit, which controls the supply of a driving voltage to the control circuit 7. The voltage control circuit and the rectifier circuit 102 form an operation control circuit, which controls the control circuit 7 so that the control circuit 7 intermittently operates.

The transformer 101 includes a supplementary winding $L_s$ in addition to the primary winding L1 and the secondary winding L2, and generates a voltage in the supplementary winding $L_s$ in accordance with the current flowing through the primary winding L1. The voltage thus generated depends on the ratio of the number of turns on the primary winding L1 to that of turns on the supplementary winding $L_s$.

The voltage induced in the supplementary winding $L_s$ is supplied to the rectifier circuit 102, which includes a diode D11 and a capacitor C11. The voltage supplied from the supplementary winding $L_s$ is subjected to the half-wave rectification by the diode D11, and is smoothed by the capacitor C11 absorbing the pulsation thereof.

The voltage rectified and smoothed by the rectifier circuit 102 is supplied to the switching circuit 103, which includes a Zener diode $D_z$, NPN transistors Q11 and Q12, resistors R11 through R14, and a diode 12.

The above voltage is applied to the Zener diode $D_z$ and the resistors R11 and R12. The Zener diode $D_z$ is turned ON when the above voltage is equal to or above a predetermined value, and is turned OFF when the above voltage is below the predetermined value.

When the above voltage is equal to or above the predetermined value, the Zener diode $D_z$ is turned ON, and a current is supplied to the resistors R11 and R12 to set the base potential of the transistor Q11 so that the transistor Q11 is switched ON. Then, the transistor Q11 draws the current through the collector thereof, to which the base of the transistor Q12 is connected and the above voltage is applied via the resistor R13. The above voltage is applied to the collector of the transistor Q12 via the resistor R14. With the transistor Q11 being switched ON, the base potential of the transistor Q12 becomes lower, so that the transistor Q12 is switched OFF. The resistor R13 is set to have a relatively high value so as to minimize the effect on the above voltage.

When the transistor Q12 is switched OFF, the above voltage is supplied to the control circuit 7 as a main (first) driving voltage to drive the control circuit 7.

When the load 3 is disconnected from the power supply unit 100, that is, no load is connected thereto, the control circuit 7 is controlled in accordance with the level of the output voltage detected by the output voltage detecting circuit 9. The control circuit 7 controls the transistor Q1 so that a lower voltage is generated in the secondary winding L2.

When the transistor Q1 is controlled by the control circuit 7 to control the current flowing through the primary winding L1 so that the lower voltage is generated in the secondary winding L2, the voltage induced in the supplementary winding $L_s$ is also lowered.

The lowered voltage in the supplementary winding $L_s$ also lowers the voltage to be rectified and smoothed by the rectifier circuit 102, causing the Zener diode $D_z$ to be turned OFF. Consequently, the potential of the connecting point of the resistor R11 with the resistor R12, namely, the base potential of the transistor Q11 is lowered, so that the transistor Q11 is switched OFF.

Then, the base potential of the transistor Q12 rises, so that the transistor Q12 is switched ON. As a result, the driving voltage of the control circuit 7 is considerably reduced with both ends of the rectifier circuit 102 connected by a low impedance, so that the control circuit 7 stops its operation.

The stoppage of the operation of the control circuit 7 Causes the transistor Q1 to be switched OFF, so that the supply of the current to the primary winding L1 is cut off. Then, the voltage generated in the secondary winding L2 is lowered to reduce the output of the rectifier circuit 8.

When the output of the rectifier circuit 8 is reduced to a lower level than a predetermined level, the level of the output voltage detected by the output voltage detecting circuit 9 becomes comparatively low. At this point, not being supplied with the main driving voltage by the switching circuit 103, the control circuit 7 is prevented from operating to supply the switching pulse to the gate of the transistor Q1 so that the electric power is transmitted to the secondary winding L2. Thus, the transistor Q1 remains OFF.

The driving voltage supplied to the control circuit 7 is controlled by the supplementary driving circuit 104 when the main driving voltage is not supplied from the switching circuit 103.

The supplementary driving circuit 104 includes a resistor R15, a diode D13, and a capacitor C12. The resistor R15 restricts a current to the control circuit 7, which is supplied by the voltage rectified by the rectifier circuit 5 and smoothed by the capacitor C1 absorbing the pulsation thereof. The current becomes very low through the resistor R15 and is supplied from the diode D13 to the capacitor C12.

The capacitor C12 is charged with the very low current supplied via the resistor R15 and the diode D13 when the supply of the current from the supplementary winding $L_s$ is cut off by the switching circuit 103.

When the supply of the current is cut off by the switching circuit 103, the control circuit 7 stops its operation after consuming a charge stored in the capacitor C12. This is because the capacitor C12 alone does not provide the control circuit 7 with enough charge to continue its operation when charged only with the very low current supplied via the resistor R15 and the diode D13. When the control circuit 7 stops its operation, the capacitor 12 is charged with the very low current supplied via the resistor R15 and the diode D13 for a predetermined period of time before the potential thereof becomes high enough to drive the control circuit 7.

When driven by the driving voltage supplied via the supplementary driving circuit 104, or a supplementary (second) driving voltage, the control circuit 7 outputs the switching pulse to the gate of the transistor Q1 in accordance with a detection signal output by the output voltage detecting circuit 9, which corresponds to the level of the output voltage detected by the output voltage detecting circuit 9. The transistor Q1 is switched ON/OFF in accordance with the switching pulse output from the control circuit 7, so that the pulsed current is supplied to the primary winding L1 of the transformer 101. Then, the voltages are generated in the secondary winding L2 and the supplementary winding $L_s$, respectively. The voltage generated in the supplementary winding $L_s$ is supplied to, and rectified and smoothed by the rectifier circuit 102, being further supplied to the switching circuit 103.

At this point, the transistor Q12 is temporarily switched OFF by the voltage supplied from the rectifier circuit 102 to the switching circuit 103, which depends on the switching period of the current generated in the supplementary winding $L_s$. Therefore, the driving voltage is applied to the control circuit 7 from the switching circuit 103. However, the transistor Q12 is again switched ON, for the above voltage does not become high enough to drive the control circuit 7 because the switching period of the transistor Q1 is not long enough. Thus, no driving voltage is applied to the control circuit 7.

When the charge stored in the capacitor C12 is consumed and the voltage thereof becomes lower than a required value to drive the control circuit 7, the control circuit again stops its operation. Then, the capacitor C12 is again charged with the very low current supplied via the resistor R15 and the diode D13.

The control circuit 7 is again driven when the capacitor C12 is charged to have a voltage high enough to drive the control circuit 7, and again stops its operation when the charge stored in the capacitor C12 is consumed and the voltage thereof becomes lower than the required value to drive the control circuit 7.

When no load is connected to the output side of the power supply unit 100, the above described circuit operation is repeated, so that the control circuit 7 only intermittently operates. Therefore, the consumption of current in the control circuit 7 can be reduced, thus decreasing the power consumption thereof when no load is connected thereto.

Figure 4:
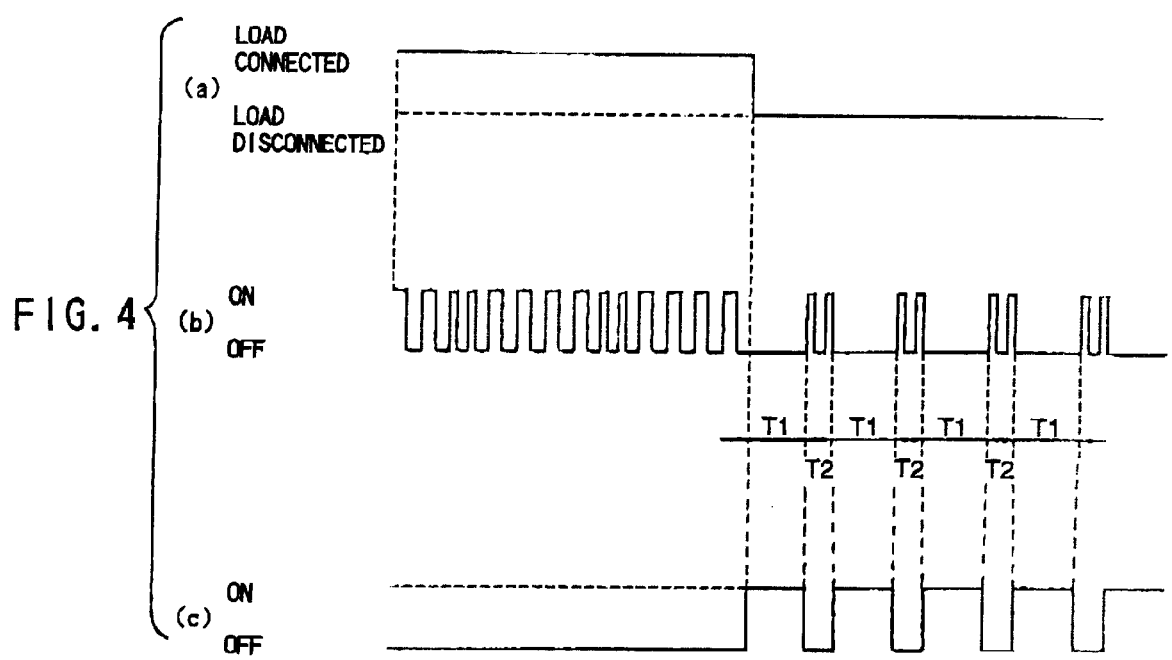
FIG. 4 is a diagram illustrating the operation of transistors employed in the power supply unit according to the present embodiment.

FIG. 4 is a diagram illustrating the operation of the transistors Q1 and Q12 according to the present embodiment. FIGS. 4(a) through (c) show the connection state of the load 3, the switching state of the transistor Q1, and the switching state of the transistor Q12, respectively.

When the load 3 is connected as shown in FIG. 4(a), the voltage generated in the supplementary winding $L_s$ is supplied to the control circuit 7 via the rectifier circuit 102 and the switching circuit 103, and the control circuit 7 is constantly supplied with the driving voltage. Then, the control circuit 7 supplies the switching pulse to the gate of the transistor Q1, so that the transistor Q1 is switched ON/OFF as shown in FIG. 4(b). By the ON/OFF switching operation of the transistor Q1, the pulsed current flows in the prima winding L1 of the transformer 101, and the electric power is transmitted to the secondary winding L2 and the supplementary winding $L_s$.

At this point, the above switching pulse is supplied to control the ON-time and OFF-time lengths of the transistor Q1 so that the output voltage remains constant.

On the other hand, when the load 3 is disconnected from the output side of the power supply unit 100, that is, no load is connected thereto, a higher output voltage is supplied to the output voltage detecting circuit 9 since the output current is not supplied to the load 3. The output voltage detecting circuit 9 outputs the detection signal corresponding to the level of the detected voltage to the control circuit 7.

Then, the control circuit 7, in accordance with the detection signal output by the output voltage detecting circuit 9, controls the switching pulse supplied to the gate of the transistor Q1 so that a lower voltage is generated in the secondary winding L2 of the transformer 101. As the lower voltage is generated in the secondary winding L2, the voltage generated in the supplementary winding $L_s$ is lowered. When the voltage generated in the supplementary winding $L_s$ becomes lower than the reference voltage of the switching circuit 103 defined by the Zener diode $D_z$, the transistor Q12 is switched ON as shown in FIG. 4(C) with the diode D12 being reverse-biased.

Consequently, the supply of the voltage generated in the supplementary winding $L_s$ to the control circuit 7 is cut off, so that the control circuit 7 is driven by the charge stored in the capacitor C12 with the transistor Q12 switched OFF as indicated by a period T2 in FIG. 4(c). During this period, the charging current is supplied from the supplementary winding $L_s$ to the capacitor C12 via the rectifier circuit 102 and the switching circuit 103. However, when the charge stored in the capacitor C12 is consumed and the voltage thereof becomes lower than the required value to drive the control circuit 7, the control circuit 7 stops its operation with the transistor Q12 switched ON as indicated by a period T1 shown in FIG. 4(c), and the transistor Q1 is switched OFF without the supply of the switching pulse.

When the capacitor C12 is charged with the very low current supplied via the resistor R15 and the diode D13, so that the potential thereof becomes high enough to drive the control circuit 7, the control circuit 7 is again driven and supplies the switching pulse to the gate of the transistor Q1. The transistor Q1 is switched ON/OFF by the switching pulse.

When the control circuit 7 is driven, the charge stored in the capacitor C12 is consumed, thus lowering the voltage of the capacitor C12. With the voltage of the capacitor C12 becoming lower than the required value to drive the control circuit 7, the control circuit 7 again stops its operation.

The control circuit 7 intermittently operates in the above described manner when the load 3 is disconnected from the power supply unit 100.

On the other hand, when the load 3 is connected to the output terminals $T_{out}1$ and $T_{out}2$, the current is supplied to the load 3. Then, the control circuit 7 controls the switching pulse supplied to the gate of the transistor 1 in accordance with the detection signal output by the output voltage detecting circuit 9 so that a larger voltage is generated in the secondary winding L2 of the transformer 101. Accordingly, a higher voltage is induced in the supplementary winding $L_s$. When the voltage induced therein becomes higher than the reference voltage of the switching circuit 103, or a threshold defined by the Zener diode Dz of the switching circuit 103, the transistor Q12 thereof is switched OFF.

With the transistor Q12 switched OFF, the voltage generated in the supplementary winding $L_s$, and rectified and smoothed in the rectifier circuit 102 is supplied to the control circuit 7 via the diode D12. Then, the control circuit is constantly driven by the above voltage, which is equal to or higher than the required value to drive the control circuit 7.

According to the present embodiment, as described above, the supply of the main driving voltage to the control circuit is cut off and the control circuit 7 only intermittently operates by the charge stored in the capacitor C12 when the load 3 disconnected from the power supply unit 100. Therefore, the power consumption thereof, as well as the electric power transmitted to the secondary winding L2 of the transformer 101 can be reduced.

Further, when the load 3 is disconnected therefrom, the OFF-time length of the transistor Q1 is longer and the ON-time length thereof is shorter compared with the time when the load 3 is connected thereto. Therefore, the power consumption in the transistor Q1 can be reduced.

Thus, the total power consumption of the power supply unit 100 can be reduced.

The present invention is not limited to the specifically disclosed embodiments, and variations and modifications may be made without departing from the scope of the present invention.

The present invention is based on Japanese priority application No. 11-191030 filed on Jul. 5, 1999, the entire contents of which are hereby incorporated by reference.

What is claimed is:

1. A power supply unit comprising:
   a transformer converting an input voltage into a predetermined output voltage;
   a transistor controlling a current flowing through a primary winding of said transformer;
   an output voltage detecting circuit detecting an output voltage of the power supply unit and outputting a detection signal corresponding to a level of a detected output voltage;
   a control circuit controlling the output voltage by switching on and off said transistor in accordance with said detection signal; and
   an operation control circuit controlling an operation of said control circuit in accordance with the output voltage,
   said operation control circuit controlling said control circuit by intermittently supplying a driving voltage to said control circuit, so that said control circuit operates intermittently when the output voltage falls below a predetermined value.

2. The power supply unit as claimed in claim 1, wherein said control circuit is constantly driven when a load is connected to a secondary winding of said transformer, and intermittently operates when no load is connected.

3. The power supply unit as claimed in claim 1, wherein said operation control circuit comprises:
   a rectifier circuit rectifying and smoothing a voltage generated in a supplementary winding of said transformer; and
   a voltage control circuit controlling a supply of a driving voltage to said control circuit in accordance with a voltage supplied from said rectifier circuit.

4. The power supply unit as claimed in claim 3, wherein said voltage control circuit comprises:
- a switching circuit supplying a first driving voltage to said control circuit; and
- a supplementary driving circuit supplying a second driving voltage to sad control circuit.

5. A power supply unit comprising:
- a transformer;
- a first control circuit controlling switching of a current flowing through a primary winding of the transformer; and
- a second control circuit controlling the first control circuit by intermittently supplying a driving voltage to the first control circuit, so that the first control circuit is intermittently enabled when no load is connected to a secondary winding of the transformer.

6. The power supply unit as claimed in claim 5, wherein:
- the transformer has a third winding; and
- the second control circuit comprises a part which controls a power supply to be supplied to the first control circuit on the basis of a voltage generated in the third winding.

7. A power supply unit comprising:
- a transformer;
- a control circuit controlling switching of a current flowing through a primary winding of the transformer; and
- a power supply system controlling supply of power to the control circuit so that a driving voltage is constantly supplied to the control circuit when a load is connected to a secondary winding of the transformer and is intermittently supplied to the control circuit when no load is connected to the secondary winding.

8. The power supply unit as claimed in claim 7, wherein the power supply system comprises:
- a condenser connected to a power supply system; and
- a control part which controls repetitive charging and discharging of the condenser when no load is connected.

* * * * *